United States Patent [19]

Ohta et al.

[11] Patent Number: 5,142,453
[45] Date of Patent: Aug. 25, 1992

[54] ILLUMINANT POINTER NEEDLE ASSEMBLY FOR VEHICULAR INSTRUMENT

[75] Inventors: Noriaki Ohta; Hiroyasu Shiratori; Tatsuo Ikegaya, all of Shimada, all of Japan

[73] Assignee: Yazaki Corporation, Tokyo, Japan

[21] Appl. No.: 601,643

[22] Filed: Oct. 23, 1990

[30] Foreign Application Priority Data

Oct. 26, 1989 [JP] Japan .................. 1-124574[U]
Mar. 29, 1990 [JP] Japan .................. 2-31914[U]

[51] Int. Cl.$^5$ ............................................. G01D 11/28
[52] U.S. Cl. ................................. 362/29; 362/26; 362/31; 362/32; 116/288; 116/DIG. 36
[58] Field of Search ............... 362/23, 26, 27, 29, 362/30, 31, 32; 116/287, 288, DIG. 36

[56] References Cited

U.S. PATENT DOCUMENTS

| | | | |
|---|---|---|---|
| 4,163,428 | 8/1979 | Ishikawa | 116/288 |
| 4,215,647 | 8/1980 | Fukasawa | 116/DIG. 36 |
| 4,218,726 | 8/1980 | Fukasawa et al. | 362/32 |
| 4,257,084 | 3/1981 | Reynolds | 362/32 |
| 4,300,470 | 11/1981 | Furukawa | 116/288 |
| 4,625,262 | 11/1986 | Sakakibara et al. | 362/32 |
| 4,845,595 | 7/1989 | Fujii et al. | 362/23 |
| 4,872,415 | 10/1989 | Nakadozon et al. | 362/26 |

Primary Examiner—Ira S. Lazarus
Assistant Examiner—Sue Hagarman
Attorney, Agent, or Firm—Nikaido, Marmelstein, Murray & Oram

[57] ABSTRACT

Described herein is an illuminant pointer needle assembly for a vehicular instrument, which is adapted to display the index portion of a pointer needle in the color of a coloring layer applied on the surface of the index portion in the day time, in a color of illumination of a light-emitting element in the nighttime when the pointer needle is lighted up, and in a mixture color in the dusk by superposing the color of illumination of the color of coloring layer reflecting incident external light. The pointer assembly essentially includes: a pointer needle having a base end portion fixedly mounted on a pointer needle shaft of a movement unit of a meter or the like and provided with a transparent index portion; a coloring layer formed on the bottom surface of the transparent index portion to reflect incident external light; a light-emitting element fixedly mounted on the base end portion of the pointer needle to light up the index portion in a color different from that of the coloring layer.

7 Claims, 3 Drawing Sheets

F I G . 2
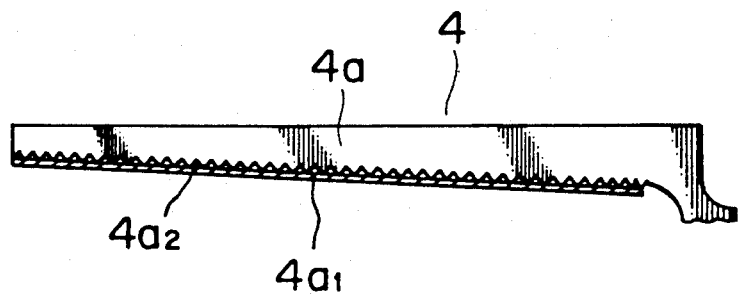
F I G . 3
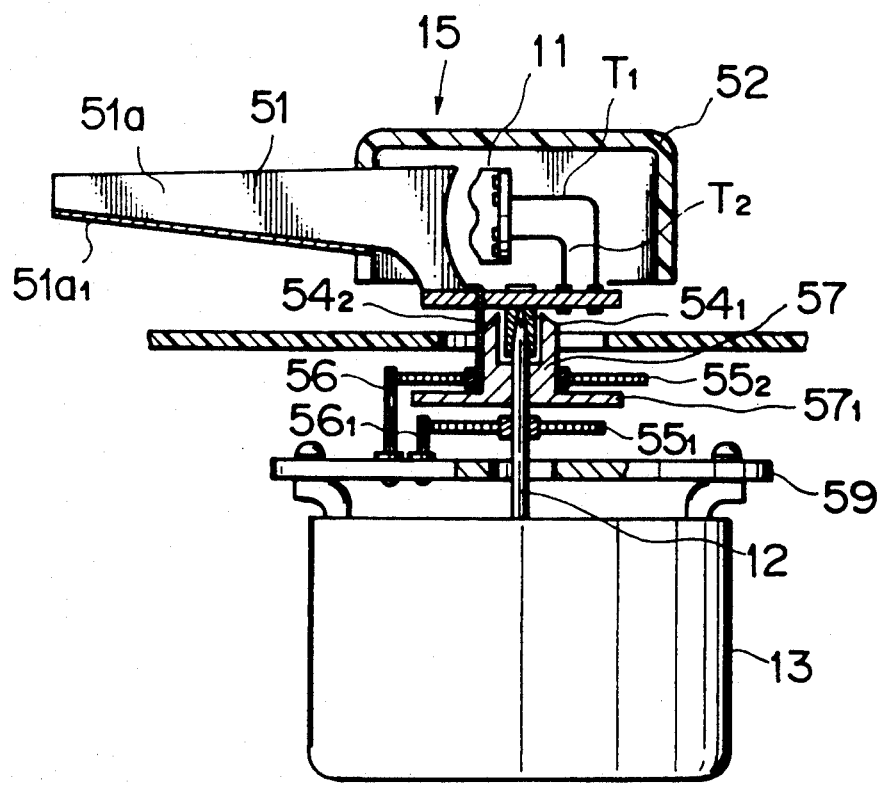

ILLUMINANT POINTER NEEDLE ASSEMBLY FOR VEHICULAR INSTRUMENT

BACKGROUND OF THE INVENTION

1. Field of the Invention

This invention relates to vehicular instruments, and more particularly to an illuminant pointer needle for vehicular instruments.

2. Description of the Prior Art

Heretofore, there have been known various vehicular instruments employing an illuminant pointer needle for the purpose of enhancing the visibility of the pointer needle, especially for enhancing its nighttime visibility.

In such instruments, it has been the usual practice to locate a light source such as an incandescent lamp or the like in the vicinity of a pointer needle and to guide light to the pointer needle through a light guide member of transparent acrylic resin material, or to mount a light-emitting element like an incandescent lamp or a light-emitting diode on the pointer needle itself for direct illumination thereof. In these cases, the pointer needle has a colored layer applied to the lower side of an index portion by hot stamping or other suitable means, so that one can recognize the needle by way of the color of the applied coloring layer which reflects external light during the daytime and by the light of illumination from the light source during the nighttime.

Namely, in any case the needle has the same color which is determined by the color of the layer applied to the index portion of the pointer needle both in the daytime when the needle is not illuminated and in the nighttime when the needle is illuminated. Therefore, depending upon the color of the applied layer, the visibility of the needle varies from daytime to nighttime, giving rise to a problem that the visibility of the pointer needle drops to an objectionable degree in terms of safety.

SUMMARY OF THE INVENTION

With the foregoing situations in view, the present invention has as its object the provision of an illuminate pointer needle assembly for vehicular instrument, which is arranged to ensure high visibility of the pointer needle all the time.

In accordance with the present invention, there is provided an illuminant pointer needle assembly for a vehicular instrument, which essentially includes: a pointer needle having a base end portion fixedly mounted on a pointer needle shaft of a movement unit and provided with a transparent index portion; a coloring layer formed on the bottom surface of the transparent index portion to reflect incident external light; a light-emitting element fixedly mounted on the base end portion of the pointer needle to light up the index portion in a color different from that of the coloring layer.

According to the present invention employing a coloring layer and a light-emitting element of different colors on the index portion, the pointer needle is visible in the color of the coloring layer which reflects external light in the daytime when the pointer needle is not illuminated and visible in the color of illumination of the light-emitting element in the nighttime when the pointer needle is lighted up by the light-emitting element. If the pointer needle is illuminated in the dusk when external light is still lingering, the pointer needle is visible in a mixture color resulting from the superposition of the color of illumination of the light-emitting element on the color of the coloring layer which reflects the external light.

The above and other objects, features and advantages of the invention will become apparent from the following description and the appended claims, taken in conjunction with the accompanying drawings which show by way of example some preferred embodients of the invention.

BRIEF DESCRIPTION OF THE DRAWINGS

In the accompanying drawings:

FIG. 2 is a schematic view of a modified pointer needle construction;

FIG. 3 is a sectional view of another embodiment of the invention, employing a duplex light-emitting element;

DESCRIPTION OF PREFERRED EMBODIMENTS

Figure 1:
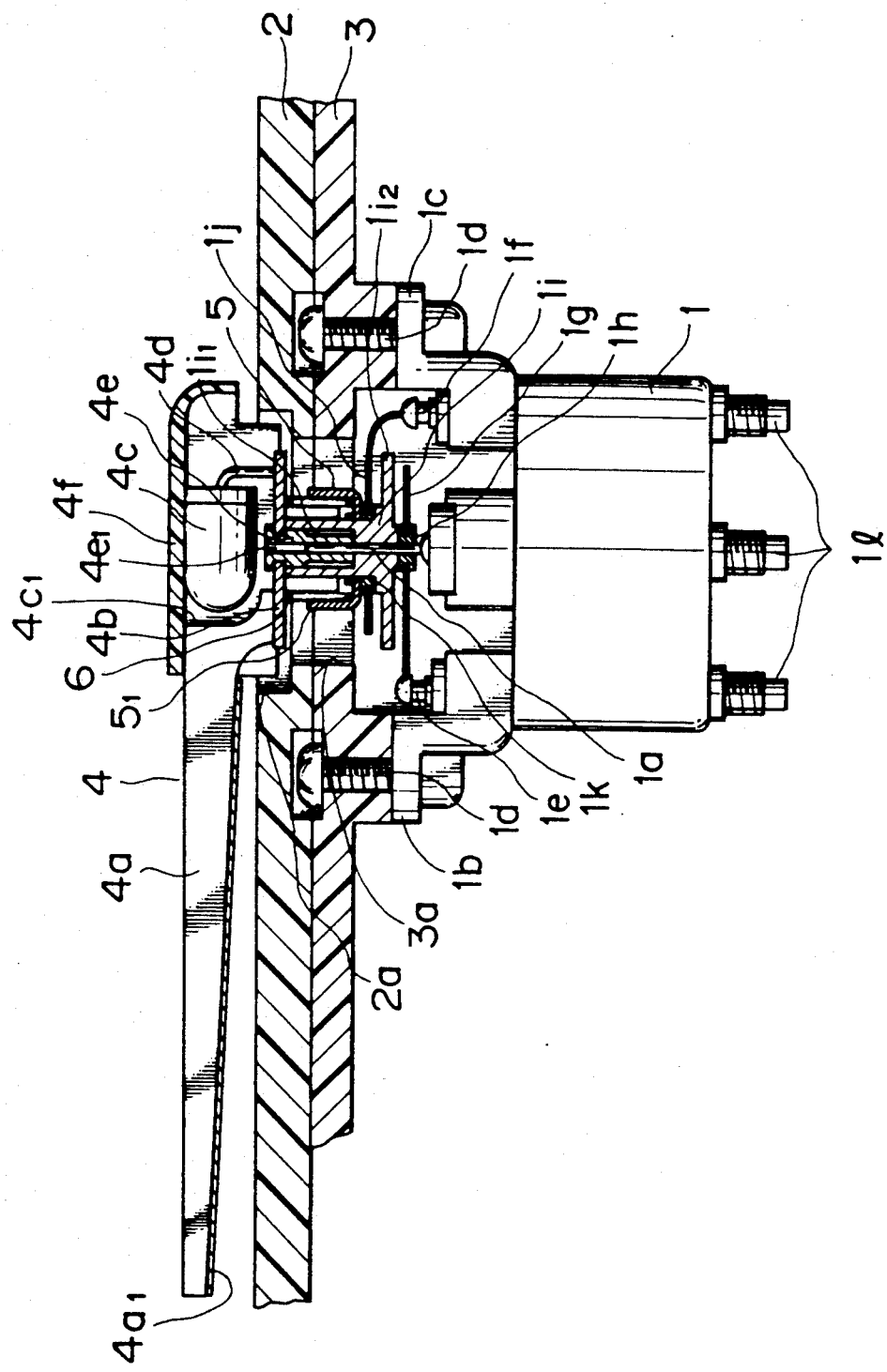
FIG. 1 is a sectional view of an illuminant pointer needle assembly according to the present invention.

Hereafter, the invention is described more particularly by way of the preferred embodiments shown in the drawings.

Referring to FIG. 1, there is shown in section the major components of a vehicular instrument pointer needle assembly embodying the present invention, in which indicated at 1 is a movement unit of a meter or the like adapted to drive a pointer needle shaft 1a according to the meterage, at 2 is a dial plate, at 3 is a light guide member placed on the back side of the dial plate 2 for guiding light thereto to illuminate from behind punch-printed letters or figures and a scale on the face of the dial plate 2, and at 4 is a pointer needle which is fixedly mounted on the pointer needle shaft 1a.

The pointer needle 4 has an index portion 4a which is formed of a transparent acrylic resin material and has, for example, a yellow coloring layer 4a₁ applied on its forwardly inclined lower surface by hot stamping or other suitable method. Securely fixed on a base portion of the index portion 4a, is a double-face printed wiring board 4b mounting on the upper side thereof a light-emitting element 4c such as a light-emitting diode, incandescent lamp or the like which emits, for example, red light, and which has a couple of lead terminals 4d electrically and mechanically connected to wiring conductor patterns on the double-face printed wiring board 4b by soldering or other suitable means. One end of a columnar member 4e of conducting material is securely fixed by caulking or other suitable means to a center portion of the double-face printed wiring board 4b, with electric connection to the conductor pattern on the upper face of the printed wiring board 4b to which one of the lead terminals 4d of the light-emitting element 4c is connected. The tip end of the pointer needle shaft 1a is fixedly fitted in a bore 4e₁ of the columnar member 4e through press-in fit.

The movement unit 1 has its bracket portions 1b and 1c securely fixed to the back side of the light guide member 3 by screws 1d such that pointer needle shaft 1a is located at the center of openings 2a and 3a in the dial plate 2 and light guide member 3. First and second terminals 1e and 1f are mounted on base portions of the brackets 1b and 1c. A zero-return hair spring 1g of phospor bronze or the like, which serves to the return the pointer needle to zero position, has its inner end connected to the needle shaft 1a through a spring connector 1h of conducting material which is fixed on the pointer needle shaft 1a.

Further, an insulating seat 1i is fixedly mounted on the pointer needle shaft 1a through press-in fit. The insulating seat 1i is centrally provided with an axial bore $1i_1$ having a small diameter portion which is fixed engaged with the pointer needle shaft 1a through press-in-fit, and a large diameter portion which is fittingly engaged with a large diameter portion formed on part of the outer periphery of the columnar member 4e. A flange $1i_2$ of large diameter is formed at the lower end of the insulating seat 1i. A hair spring 1j of phosphor bronze or the like, which is coiled in the opposite direction relative to the above-mentioned hair spring 1g, has its inner end connected to the needle shaft 1a through a spring connector 1k of conducting material which is securely fixed on the outer periphery of the insulating seat 1i. The outer end of the hair spring 1j is securely fixed to the second terminal 1f. The large-diameter flange $1i_2$ on the insulating seat 1i is interposed between the hair springs 1g and 1j to prevent these springs from contacting with each other.

The conductor pattern on the lower face of the double-face printed wiring board 4b, to which the other lead terminal of the light-emitting element 4c is connected, is held in contact with one end of a metal coil spring 6 compressed between a spring retainer 5 of conducting material, which is fitted on the outer periphery of the insulating seat 1i in contact with the spring connector 1k, and the lower face of the printed wiring board 4b. The spring retainer 5 is provided with an uprising wall $5_1$ which has an inside diameter slightly larger than the outer diameter of the coil spring 6 to hold the latter in stable state, thereby maintaining the predetermined electric connection in a secure manner and preventing its contact with other component parts.

The base end of the pointer needle 4 is covered under a cap 4f which masks unnecessary portions including a light introducing inner end of the index portion 4a, light-emitting element 4c and double-face printed wiring board 4b and so forth.

Indicated at 1l are terminals to be supplied with input signals for the movement unit 1.

With the above-described arrangement, one of the lead terminals 4d of the light-emitting element 4c is electrically connected to the first terminal 1e through the conductor patter on the upper face of the double-face printed wiring board 4b, columnar member 4e, pointer needle shaft 1a, spring connector 1h and hair spring 1g, while the other one of the lead terminals 4d is electrically connected to the second terminal 1f through the conductor pattern on the lower face of the double-face printed wiring board 4b, coil spring 6, spring retainer 5, spring connector 1k and hair spring 1j. Upon connecting a power source between these terminals 1e and 1f, current flows through the light-emitting element 4c to emit red light, which is directly led into the index portion 4a through the light introducing end 4c to illuminate the entire index portion 4a with red light.

Accordingly, in this embodiment employing the yellow coloring layer $4a_1$ on the index portion 4a of the pointer needle 4 in combination with the light-emitting element 4c of red light, the pointer needle is clearly visible in the color of the coloring layer $4a_1$ on the index portion 4a in the daytime when the pointer needle 4 is non-illuminated state, and in the color of illumination of the light-emitting element 4c in the nighttime when the pointer needle 4 is in illuminated state. If the pointer needle 4 is illuminated in the dusk when external light still lingers, the pointer needle 4 is visible in amber color, mixture of the yellow color of the coloring layer $4a_1$ on the index portion 4a, which reflects the external light, and the red color of illumination of the light-emitting element 4c. As the ambience becomes darker, namely, as the external light decreases, the pointer color changes gradually from amber to red as a result of reductions of the yellow component from the coloring layer $4a_1$. In this manner, the pointer color is displayed in different colors in the daytime and nighttime, gradually changing the color of the pointer needle according to the ambient light level. By combining a coloring layer $4a_1$ which is clearly visible in the daytime with a light-emitting element 4c with an illumination color which is clearly visible in the nighttime, it becomes possible to indicate the pointer needle clearly all the time, ensuring high safety not only in the daytime and nighttime but also in the dusk or in the transitional time from day to night. Besides, this makes it possible to select in various combinations the color for the coloring layer and the color of illumination by the light-emitting element in a suitable visible range for the purpose of broadening the pointer needle color variation, which is also favorable from the standpoint of design effects.

Further, since the index portion 4a is illuminated by the built-in light-emitting element 4c on the pointer needle 4, there is no need for introducing external light into the pointer needle 4, precluding the problems such as drop in luminosity of an illuminated pointer needle due to light attenuation prior to introduction into the pointer needle or variations in luminosity depending upon the rotational or angular position of a pointer needle. The light-emitting element is mounted on the pointer needle in a suitable manner which can guarantee secure power supply to the light-emitting element by the means of a simple arrangement. The hair springs 1g and 1j are coiled in the opposite directions that the torque Tg of the hair spring 1g and the torque Tj of the hair spring 1j counteract each other when the pointer needle 4 is in zero position, suppressing increases in the braking toques which are applied to the pointer needle shaft 1a by the two hair springs.

When assembling the pointer needle assembly of the above-described construction, the spring connector 1h, hair spring 1g, insulting seat 1i, spring connector 1k, hair spring 1j and spring retainer 5 are assembled onto the movement unit 1 before attaching the latter to the light guide member 3. On attachment of the movement unit 1, the coil spring 6 is mounted in position through the openings 2a and 3a, and the columnar terminal member 4e, which has been pre-assembled with the needle, is fitted into the bore $1i_1$ of the insulating seat 1i, fixing the fore end of the pointer needle shaft 1a in the bore $4e_1$ of the columnar terminal member 4e through press-in fit. By so doing, the coil spring 6 is compressed between the double-face printed wiring board 4b and the spring retainer 5. Thus, the assembling of the pointer needle is completed in an extremely simplified manner, including the necessary electric connections.

Illustated in FIG. 2 is another embodiment of the invention, wherein a color layer $4a_1$ is applied by hot stamping to an irregular reflection surface which is formed on the lower side of the index portion 4a of the pointer needle 4 by a craping or other suitable operation.

In a case where a light-emitting diode is employed as the light-emitting element, the irregular reflection surface $4a_2$ serves to eliminate the problem of uneven illumination which might occur in the nighttime due to the directionability of light emitted from the LED.

If desired, a coloring layer of a light-transmitting color ink may be formed on the upper surface of the index portion $4a$ of the pointer needle.

Referring to FIG. 3, there is shown another embodiment of the invention, in which similarly to the foregoing embodiments the pointer needle assembly is basically constituted by a movement unit 13 for driving a pointer needle shaft 12 according to meterage, a dial plate and an illuminant pointer needle 51 fixedly mounted on the pointer needle shaft 12 of the movement unit 13. The illuminant pointer needle 51 has an index portion $51a$ which is formed of a transparent acrylic resin material and has, for example, a yellow coloring layer $51b$, applied on its forwardly inclined lower surface by hot stamping or other suitable method.

In this embodiment, the pointer needle is provided with a duplex light-emitting element 11 which has a couple of light-emitting elements of different illumination colors between a couple of terminals $T_1$ and $T_2$. Together with a double-face printed wiring board 53 which is fixedly supported on a base portion of the pointer needle 51, the duplex light-emitting element 11 is concealed from outer view by a cap 52 which is fitted over the base end portion of the pointer needle 51. The duplex light-emitting element is fixedly mounted on the double-face printed wiring board 53 with its pair of terminals $T_1$ and $T_2$ electrically and mechanically connected to conductor patterns (not shown) on the double-face printed wiring board 53 by soldering or other suitable means.

A columnar terminal member $54_1$ is securely fixed to a center portion of the double-face printed wiring board 53, in contact with the conductor patter on the upper side of the double-face printed wiring board 53 to which one terminal $T_1$ of the duplex light-emitting element 11 is connected. The columnar terminal member $54_1$ is provided with an axial bore $54'_1$ which is fixedly engaged with a tip end portion of the pointer needle shaft 12 through press-in fit.

A zero-return hair spring 55 of phosphor bronze or other suitable material, which serves to return the pointer needle $51_1$ to zero position, has its inner end securely fixed to the pointer needle shaft 12. The outer end of the hair spring $55_1$ is securely fixed to a terminal $56_1$.

Further, a seat 57 of insulating material is fixedly mounted on the pointer needle shaft 12 through press-in fit. Securely connected to the outer periphery of the insulating seat 57 is the inner end of another hair spring $55_2$ of phosphor bronze or the like which is coiled in the opposite direction relative to the first hair spring $55_1$ and which has its outer end securely fixed to a terminal $56_2$. A flange $57_1$ which is provided at the lower end of the insulating seat 57 is interposed between the first and second hair springs $55_1$ and $55_2$ to prevent them from contacting with each other.

Securely fixed on the outer periphery of the insulating seat 57 is a terminal member $54_2$ which is connected at one end thereof to the inner end of the hair spring $55_2$ and at the other end to the conductor pattern on the lower side of the double-face printed wiring board 53 to which the other terminal $T_2$ of the duplex light-emitting element 11 is connected. The terminals $56_1$ and $56_2$ are connected to a drive circuit on a printed circuit board 59 which is fixed on the casing of the movement unit 13, as will be described hereinlater.

Thus, the terminals $T_1$ and $T_2$ of the duplex light-emitting element 11 are connected to the printed circuit board 59 through the terminal members $54_1$ and $54_2$, hair springs $55_1$ and $55_2$, and terminals $56_1$ and $56_2$, respectively, to light on selectively one of light-emitting diodes $D_1$ and $D_2$ of the duplex light-emitting element 11 for illumination of the pointer needle 11.

Figure 4:
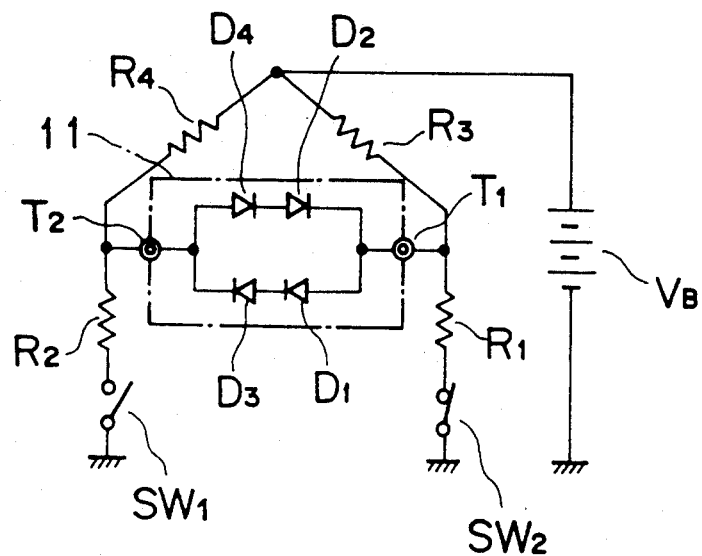
FIG. 4 is a diagram of a drive circuit for the duplex light-emitting element.

Shown in FIG. 4 is a diagram of a drive circuit for the duplex light-emitting element, in which indicated at $D_1$ and $D_2$ are diodes employed as unidirectional elements, and at $R_1$ and $R_2$ are resistances. Indicated at $D_3$ and $D_4$ are the two light-emitting diodes of the duplex light emitting element 11. The light-emitting diodes $D_3$ and $D_4$ are connected forwardly in series with diodes $D_1$ and $D_2$, respective, to form two series circuits, which are connected in parallel and in the opposite directions between the pair of terminals $T_1$ and $T_2$ of the duplex light-emitting element 11. The light emitting diode $D_1$ emits green light while the light emitting diodes $D_2$ emits red light.

The two terminals $T_1$ and $T_2$ are connected to a battery $V_B$ through resistances $R_3$ and $R_4$, and to switches $SW_1$ and $SW_2$ through resistances $R_1$ and $R_2$, respectively. The resistances R1 to R4 forms a bridge circuit and the afore-mentioned parallel circuits are connected between its output terminals ($T_1$ and $T_2$).

With this arrangement, upon closing the switch $SW_1$ when driving the car at a normal speed at night, current flows through battery $V_B$, resistance $R_3$, diode $D_3$, light-emitting diode $D_1$ and resistance $R_2$ to light on the LED $D_1$ for illumination of the pointer needle with green light. On the other hand, upon closing the switch $SW_2$ when driving the car at night at a speed in excess of a predetermined speed limit, current flows through battery $V_B$, resistance $R_4$, diode $D_4$, light-emitting diode $D_2$ and resistance $R_1$ to light on the LED $D_2$ for illumination of the pointer needle with red light.

When both of the switches $SW_1$ and $SW_2$ are closed concurrently, the bridge circuit is put in balanced state with zero potential between the terminals $T_1$ and $T_2$, so that both of the light-emitting diodes $D_1$ and $D_2$ are held in off state.

Figure 5:
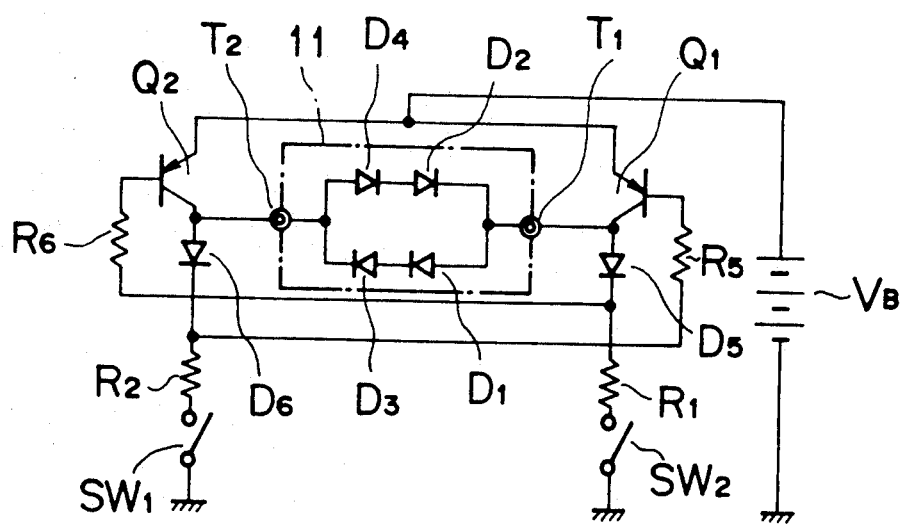
FIG. 5 is a circuit diagram of another example of drive circuit for the duplex light-emitting element.

Illustrated in FIG. 5 is another example of the drive circuit for the duplex light-emitting element 11, in which indicated at $Q_1$ and $Q_2$ are transistors, at $R_1$, $R_2$, $R_5$ and $R_6$ are resistances, and at $D_3$ to $D_6$ are diodes. Emitters of the transistors $Q_1$ and $Q_2$ are connected to a battery $V_B$, and their collectors are connected to terminals $T_1$ and $T_2$ and to anodes of the diodes $D_5$ and $D_6$, respectively. The bases of the transistors $Q_1$ and $Q_2$ are connected to the cathodes of the diodes $D_6$ and $D_5$ through resistances $R_5$ and $R_6$, respectively, while the cathodes of the diodes $D_6$ and $D_5$ are connected to switches $SW_2$ and $SW_1$ through resistances $R_1$ and $R_2$, respectively. A drive bridge circuit is formed by the transistors $Q_1$ and $Q_2$ and resistances $R_1$ and $R_2$, and the afore-mentioned parallel circuits are connected between its output terminals, namely, between the collectors ($T_1$ and $T_2$) of transistors $Q_1$ and $Q_2$.

With this arrangement, when the switch $SW_1$ is closed, the transistor $Q_1$ is turned on, and current flows through battery $V_B$, transistor $Q_1$, diode $D_3$, light-emitting diode $D_1$, diode $D_6$ and resistance $R_2$ to light on LED $D_1$ for illumination of the pointer needle. On the other hand, when the switch $SW_2$ is closed, the transistor $Q_2$ is turned on, and current flows through battery $V_B$, transistor $Q_2$, light-emitting diode $D_2$, diode $D_4$, diode $D_5$ and resistance $R_1$ to light on LED $D_2$ for illumination of the pointer needle. When the switches $SW_1$ and $SW_2$ are closed concurrently, the driver bridge circuit is put in balanced state similarly to the circuitry of FIG. 4, holding both of the light-emitting diodes $D_1$ and $D_2$ in off state.

In a case where the switches $SW_1$ and $SW_2$ are alternately closed at high speed, the lighting colors of the light-emitting diodes $D_1$ and $D_2$ can be mixed according to the duration of their on-periods.

Since the duplex light-emitting element 11 has only two terminals $T_1$ and $T_2$, it can be connected to the control circuit simply by the use a pair of terminals members $54_1$ and $54_2$, a pair of hair springs $55_1$ and $55_2$.

In the foregoing embodiments, there is no particular restriction on the construction of the duplex light-emitting element 11. It may be constituted by a plural number of molded elements of semiconductor chips, or by a plural number of elements which are independently mounted on a printed wiring board.

Further, in the drive circuit of FIGS. 4 and 5, arrangements may be made to close the switches SW1 and SW2 alternately at high speed under duty control by a pulse drive, lighting on the light-emitting diodes D1 and D2 alternately for illuminating the pointer needle in various mixed colors during the daytime when the pointer needle 51 is not illuminated, it is clearly visible in the color of the coloring layer $51a_1$ on the index portion 51a.

It will be appreciated from the foregoing description that, according to the present invention, the pointer needle is provided with a coloring layer on its index portion in combination with a light-emitting element capable of emitting light of a color different from that of the coloring layer. Therefore, in the daytime when the pointer needle is not in illuminated state, the pointer needle is visible in the color of the coloring layer which reflects external light, and, in the nighttime when the pointer needle is illuminated, it is visible in the color of illumination of the light-emitting element. Further, if the pointer needle is illuminated in the dusk when external light still remains, it is visible in a mixture color resulting from superposition of the color of illumination by the light-emitting element on the color of the coloring layer reflecting external light. Thus, the pointer needle can be suitably displayed in the color of the coloring layer which is clearly visible in the daytime, or illuminated by the light-emitting element in a color which is clearly visible in the nighttime, ensuring high visibility of the pointer needle for safety purposes not only in the daytime and nighttime but also in the dusk, a transitional time from day to night. It also becomes possible to broaden the range of color variations of the pointer needle by employing various combinations of clearly visible colors for the coloring layer and the light-emitting element for the purpose of giving a greater freedom in design.

What is claimed is:

1. An illuminant pointer needle assembly for a vehicular instrument, comprising:
    a pointer needle having a base end portion fixedly mounted on a pointer needle shaft of a movement unit and provided with a transparent index portion;
    a layer of a selected color formed on a bottom surface of the transparent index portion selectively reflecting incident external white light and to illuminate the transparent index portion in the selected color; and
    a light-emitting element having a light-emitting diode and being fixedly mounted on the base end portion of said pointer needle, said light-emitting element formed so as to emit light of a first single wavelength range which is totally reflective to the bottom surface of the transparent index portion and thereby to light up the transparent index portion in a color according to the first single wavelength range and different from the selected color when the external white light is incident upon said pointer needle.

2. An illuminant pointer needle assembly as defined in claim 1, wherein said bottom surface of said index portion tapered toward the fore end thereof.

3. An illuminant pointer needle assembly as defined in claim 1 wherein the bottom surface of the transparent index portion is an irregular reflection surface, the selected color layer being formed on the irregular reflection surface so as to reflect light through the irregular reflection surface.

4. An illuminant pointer needle assembly as defined in claim 1 wherein the light-emitting diode is fixedly mounted on a double-faced printing wiring board fixedly supported on the base end of said pointer needle, one of two lead terminals of the light-emitting diode being connected to one face of the printed wiring board and a second of the two lead terminals being connected to a second face of the printed wiring board, the one face of the printed wiring board being electrically connected to a first electrical terminal by a first hair spring which serves to return said pointer needle to a zero position, one end of the first hair spring being connected to the first electrical terminal and a second end of the hair spring being electrically connected to the pointer needle which is electrically connected to the one face of the printed wiring board, and
    the second face of the printed wiring board being electrically connected with a second electrical terminal by a second hair spring which is coiled in a direction opposite to a direction in which the first hair spring is coiled, one end of the second hair spring being connected to the second electrical terminal and a second end of the second electrical terminal being connected to the second face of the printed wiring board through a resilient conductor, the resilient conductor being compressedly accommodated in an annular space between the second end of the second hair spring and the second face of the printed wiring board, and being electrically insulated from the first hair spring and from the pointer needle shaft.

5. An illuminant pointer needle assembly as defined in claim 1, wherein said coloring layer is formed on the top surface of said index portion of said pointer needle by appplication of a light-transmitting coloring ink.

6. An illuminant pointer needle assembly as defined in claim 1, wherein said light-emitting element is a duplex light-emitting element having a pair of light-emitting diodes one of which emits light of the first single wavelength range and the other of which emits light of a second single wavelength range and connected between a pair of terminals to a power source through a drive circuit means, the light-emitting diodes each being connected in series with and forward of a unidirectional element to form series circuits, each series circuit being connected in parallel to one another and in opposite directions between the pair of terminals, the drive circuit means being for controlling which of the pair of light-emitting diodes to activate when said light-emitting element is active to emit light.

7. An illuminant pointer needle assembly as defined in claim 6, wherein said drive circuit operates so as to selectively apply electrical voltages opposite to one another according to illumination of the transparent index portion with the selected color.

* * * * *